United States Patent
Sakamoto

(10) Patent No.: US 12,094,131 B2
(45) Date of Patent: Sep. 17, 2024

(54) POSITIONAL PRECISION ASSESSMENT DEVICE, STORAGE MEDIUM STORING COMPUTER PROGRAM FOR POSITIONAL PRECISION ASSESSMENT, AND METHOD FOR DETERMINING POSITIONAL PRECISION

(71) Applicant: TOYOTA JIDOSHA KABUSHIKI KAISHA, Toyota (JP)

(72) Inventor: Masahiro Sakamoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/075,779

(22) Filed: Dec. 6, 2022

(65) Prior Publication Data

US 2023/0177704 A1   Jun. 8, 2023

(30) Foreign Application Priority Data

Dec. 6, 2021   (JP) .................................. 2021-197958

(51) Int. Cl.
| | |
|---|---|
| *G06T 7/246* | (2017.01) |
| *B60W 50/14* | (2020.01) |
| *B60W 60/00* | (2020.01) |
| *G01C 21/30* | (2006.01) |

(Continued)

(52) U.S. Cl.
CPC .............. *G06T 7/248* (2017.01); *G01C 21/30* (2013.01); *G06T 7/74* (2017.01); *B60W 50/14* (2013.01); *B60W 60/0053* (2020.02); *B60W 2420/403* (2013.01); *B60W 2554/4041* (2020.02); *G06T 7/277* (2017.01); *G06T 2207/30256* (2013.01)

(58) Field of Classification Search
CPC ........... G06T 7/248; G06T 7/74; G06T 7/277; G06T 2207/30256; G01C 21/30; B60W 50/14; B60W 60/0053; B60W 2420/403; B60W 2554/4041
See application file for complete search history.

(56) References Cited

U.S. PATENT DOCUMENTS

| | | | |
|---|---|---|---|
| 2018/0281790 A1 | 10/2018 | Oyama | |
| 2024/0034362 A1* | 2/2024 | Oba ...................... | B60W 50/14 |

FOREIGN PATENT DOCUMENTS

| | | | | |
|---|---|---|---|---|
| JP | 2016-224802 A | 12/2016 | | |
| JP | 2018173304 A | * 11/2018 | ............ | B60W 10/06 |
| JP | 2019-007739 A | 1/2019 | | |

(Continued)

*Primary Examiner* — Curtis A Kuntz
*Assistant Examiner* — James E Munion
(74) *Attorney, Agent, or Firm* — Oliff PLC

(57) ABSTRACT

The positional precision assessment device has a processor configured to estimate a first location of a moving object at a first time based on an image representing road features and positional information, estimate a second location at the first time based on a location of the moving object at the second time and an amount of movement and change in direction from the second time to the first time, input the first and second location into a filter and calculate a current location at the first time, and determine a state of precision of the current location based on a difference between the current location of the moving object and a location estimated based on a location of the moving object at a time prior to the first time and an amount of movement and change in direction from the prior time to the first time.

8 Claims, 8 Drawing Sheets

(51) Int. Cl.
    *G06T 7/277*    (2017.01)
    *G06T 7/73*     (2017.01)

(56) References Cited

FOREIGN PATENT DOCUMENTS

| JP | 2019-027995 A |   | 2/2019  |
|----|---------------|---|---------|
| JP | 2020-193954 A |   | 12/2020 |
| JP | 2021017073 A  | * | 2/2021  |

* cited by examiner

POSITIONAL PRECISION ASSESSMENT DEVICE, STORAGE MEDIUM STORING COMPUTER PROGRAM FOR POSITIONAL PRECISION ASSESSMENT, AND METHOD FOR DETERMINING POSITIONAL PRECISION

FIELD

The present disclosure relates to a positional precision assessment device, to a storage medium storing a computer program for positional precision assessment, and to a method for determining positional precision.

BACKGROUND

An autonomous control system mounted in a vehicle creates a navigation route for the vehicle based on the current location of the vehicle, the destination location of the vehicle, and a navigation map. The autonomous control system estimates the current location of the vehicle using the map information and causes the vehicle to travel along the navigation route.

The autonomous control system is preferably capable of precisely estimating the current location of the vehicle. For example, the autonomous control system may estimate a first estimated location based on an image representing road features on the road surface surrounding the vehicle, and positional information for the road features on the map. The autonomous control system may also estimate a second estimated location based on the location of the vehicle at a previous time and the amount of movement of the vehicle from the previous time to the current time, as well as the degree of change in direction. The autonomous control system may estimate the current location of the vehicle based on the first estimated location and second estimated location (see Japanese Unexamined Patent Publication No. 2016-224802, for example).

SUMMARY

The current location of the vehicle estimated based on the first estimated location and second estimated location may not be accurate, depending on factors such as the condition of the road features represented in the image, errors in the amount of movement or change in direction of the vehicle, or lateral sliding of the vehicle. Since the autonomous control system causes the vehicle to travel based on the current location of the vehicle, any error in the current location of the vehicle can potentially prevent the vehicle from being caused to safely travel.

It is an object of the present disclosure to provide a positional precision assessment device that can determine the state of precision of an estimated current location of the moving object.

One embodiment of the invention provides a positional precision assessment device. The positional precision assessment device has a first location estimating unit that estimates a first location of a moving object at a first time based on an image representing road features on a road surface surrounding the moving object at the first time and positional information for the road features on the road surface, a second location estimating unit that estimates a second location of the moving object at the first time based on a location of the moving object at a second time which is before the first time, and an amount of movement and change in direction of the moving object from the second time to the first time, a calculating unit that inputs the first location and second location at the first time into a prediction filter and calculates a current location of the moving object at the first time, and an assessment unit that determines a state of precision of the current location of the moving object based on a first difference between the current location of the moving object at the first time and a location estimated based on a location of the moving object at a time prior to the first time and an amount of movement and change in direction of the moving object from the prior time to the first time.

The assessment unit in the positional precision assessment device preferably calculates a second difference between the first location and the second location of the moving object at the first time, and the assessment unit preferably determines the state of precision of the current location of the moving object based on the first difference and second difference.

The assessment unit in the positional precision assessment device preferably uses a different reference when determining for change from a good state to a poor state of precision of the current location of the moving object, and when determining for change from the poor state to the good state of precision of the current location of the moving object.

The assessment unit of the positional precision assessment device also preferably determines the state of precision of the current location of the moving object by comparing the second difference with a predetermined reference threshold.

The assessment unit of the positional precision assessment device preferably further notifies a driver of need to participate in operation of the moving object, via a notification unit, based on the state of precision of the current location of the moving object.

The assessment unit of the positional precision assessment device also preferably uses the second time as the previous time.

According to another embodiment, a non-transitory storage medium storing a computer program for a computer program for positional precision assessment is provided. The computer program for positional precision assessment causes a processor execute a process, the process includes estimating a first location of a moving object at a first time based on an image representing road features on a road surface surrounding the moving object at the first time and positional information for the road features on the road surface, estimating a second location of the moving object at the first time based on a location of the moving object at a second time which is before the first time, and an amount of movement and change in direction of the moving object from the second time to the first time, inputting the first location and second location at the first time into a prediction filter and calculate a current location of the moving object at the first time, and determining a state of precision of the current location of the moving object based on a first difference between the current location of the moving object at the first time and a location estimated based on a location of the moving object at a time prior to the first time and an amount of movement and change in direction of the moving object from the prior time to the first time.

According to yet another embodiment of the invention there is provided a method for determining positional precision carried out by a positional precision assessment device. The method for determining positional precision includes estimating a first location of a moving object at a first time based on an image representing road features on a road surface surrounding the moving object at the first time and positional information for the road features on the road surface, estimating a second location of the moving object at the first time based on a location of the moving object at a second time which is before the first time, and an amount of movement and change in direction of the moving object from the second time to the first time, inputting the first location and second location at the first time into a prediction filter and calculate a current location of the moving object at the first time, and determining a state of precision of the current location of the moving object based on a first difference between the current location of the moving object at the first time and a location estimated based on a location of the moving object at a time prior to the first time and an amount of movement and change in direction of the moving object from the prior time to the first time.

The positional precision assessment device of the present disclosure can determine the state of precision of an estimated current location of the moving object.

The object and advantages of the invention will be realized and attained by means of the elements and combinations particularly pointed out in the claims. It is to be understood that both the foregoing general description and the following detailed description are exemplary and explanatory and are not restrictive of the invention, as claimed

DESCRIPTION OF EMBODIMENTS

Figure 1A:
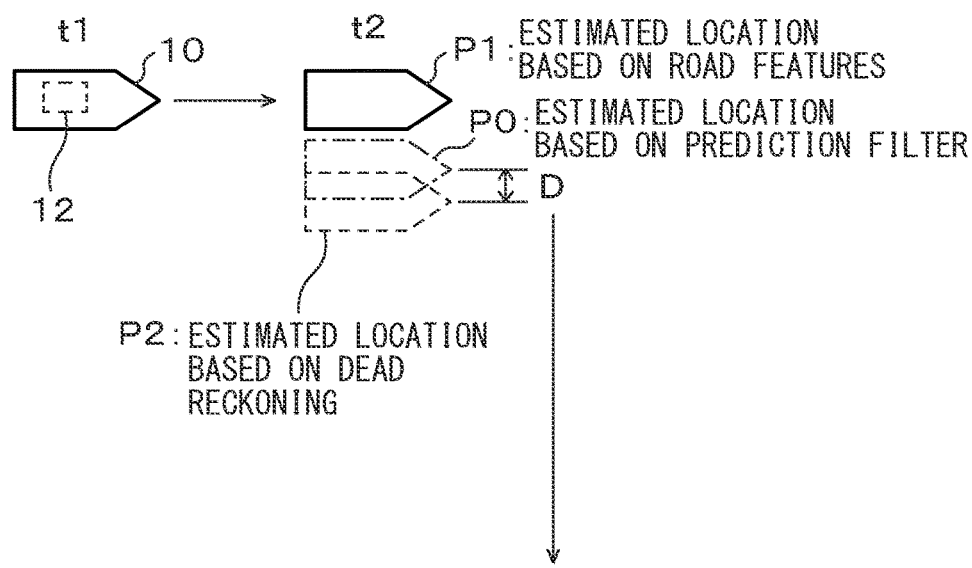
FIG. 1A is a diagram illustrating operation of the positional precision assessment device of the embodiment in overview.
Figure 1B:
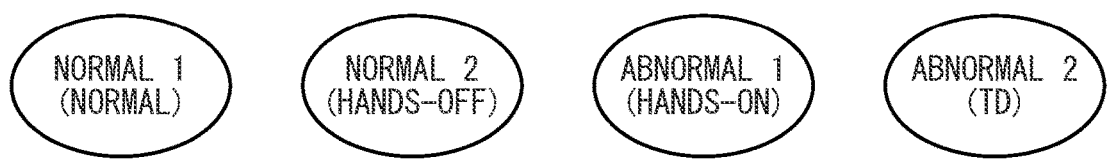
FIG. 1B is a diagram illustrating operation of the positional precision assessment device of the embodiment in overview.

FIG. 1A and FIG. 1B are diagrams illustrating operation of the positional precision assessment device of the embodiment in overview. The following is a summary of operation relating to positional precision assessment processing of a location estimating device 12 as an example of the positional precision assessment device disclosed herein, explained with reference to FIG. 1A and FIG. 1B.

A vehicle 10 travels while the current location is estimated in a predetermined cycle using a location estimating device 12. The vehicle 10 is an example of a moving object.

As shown in FIG. 1A, the location estimating device 12 estimates the location of the vehicle 10 at time t1, based on an image showing road features (such as lane marking lines) on the road surface surrounding the vehicle 10 at time t1, and positional information for the road features on the road surface (such as map information). Similarly, at time t2 where a predetermined cycle has elapsed after time t1, the location estimating device 12 estimates a location P1 of the vehicle 10 at time t2 (the estimated location based on road features).

The location estimating device 12 also estimates a location P2 of the vehicle 10 at time t2 (estimated location by dead reckoning), based on the location of the vehicle 10 at time t1 and the amount of movement and change in direction of vehicle 10 from time t1 up to time t2.

The location estimating device 12 inputs location P1 and location P2 of the vehicle 10 at time t2 into a prediction filter (such as a Kalman filter), and calculates the current location P0 of the vehicle 10 at time t2 (estimated location by prediction filter). The current location P0 is used to control driving of the vehicle 10. The current location P0 is also used to determine the next second estimated location (estimated location by dead reckoning).

The location estimating device 12 calculates the difference D between estimated location P2 of the vehicle 10 at time t2 and the current location P0. In the example shown in FIG. 1A, the lateral difference in the transverse direction perpendicular to the traveling direction of the vehicle 10 is represented as the difference D.

The following factors can potentially produce the difference D. (1) Abnormalities in the camera that takes the image representing the road features on the road surface surrounding the vehicle 10, (2) lack of clarity of road features on the road surface surrounding the vehicle 10 (for example, thin spots on lane marking lines), (3) mismatch between the high precision map representing the positional information for the road features on the road surface, and the current terrain, (4) abnormalities in the speed sensor used to determine the amount of movement of the vehicle 10, (5) abnormalities in the yaw rate sensor used to determine the amount of change in direction of the vehicle 10, and (6) transverse sliding of the vehicle 10.

The location estimating device 12 determines the state of precision for the current location of the vehicle 10 based on the difference D. In the example shown in FIG. 1B, the state of precision of the current location of the vehicle 10 is determined as Normal 1 (Normal), Normal 2 (Hands-off), Abnormal 1 (Hands-on) or Abnormal 2 (Transition Demand: TD). The state of precision of the current location of the vehicle 10 is optimal at Normal 1 (Normal), followed by Normal 2 (Hands-off), Abnormal 1 (Hands-on) and Abnormal 2 (TD).

When the state of precision of the current location of the vehicle 10 is determined to be Normal 1 or Normal 2, driving of the vehicle 10 is automatically controlled in a safe manner based on the current location of the vehicle 10 estimated by the location estimating device 12.

When the state of precision of the current location of the vehicle 10 is determined to be Abnormal 1 or Abnormal 2, on the other hand, driving of the vehicle 10 may not be automatically controlled in a safe manner based on the current location of the vehicle 10 estimated by the location estimating device 12.

When the state of precision of the current location of the vehicle 10 is determined to be Abnormal 1 (Hands-on), the location estimating device 12 notifies the driver of a hands-on request, for hands-on steering. When the state of precision of the current location of the vehicle 10 is determined to be Abnormal 2 (TD), the location estimating device 12 notifies the driver of a control transition request for switching driving of the vehicle 10 from autonomous control to manual control.

For example, if the lane marking lines, as an example of a road feature, are not properly represented in the image due to a camera abnormality, the state of precision of the current location of the vehicle 10 may determine the condition to be Abnormal 1 or 2. If the lane marking lines are not properly identified from the image due to thin spots in the lane marking lines, then the state of precision of the current location of the vehicle 10 may likewise determine the condition to be Abnormal 1 or 2. The state of precision of the current location of the vehicle 10 is therefore affected not only by hardware such as sensors, but also by factors other than hardware.

Since the location estimating device 12 can thus determine the state of precision of the estimated current location of the vehicle 10, it can serve as information for safe driving of the vehicle 10 based on the determined results.

Figure 2:
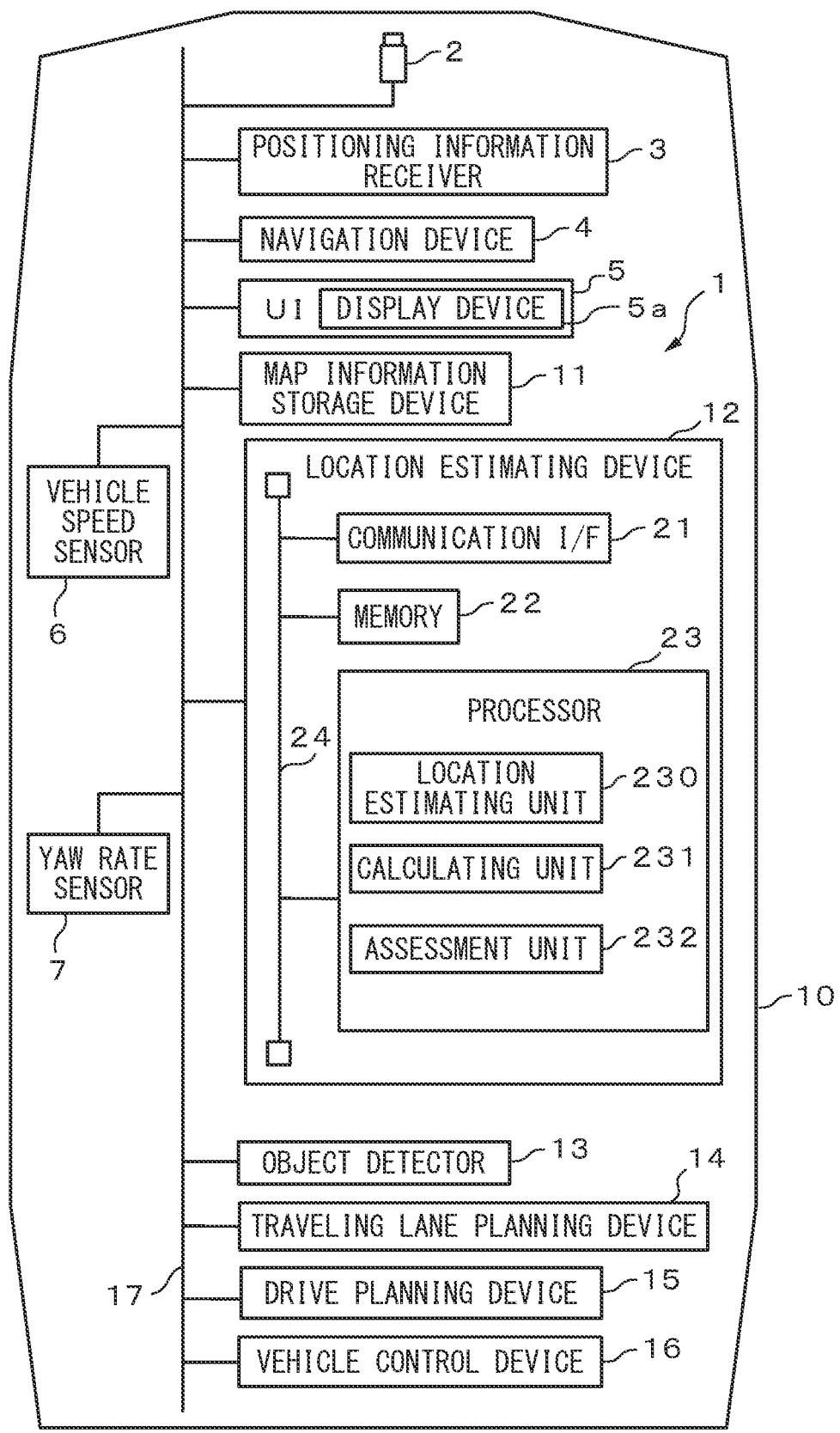
FIG. 2 is a general schematic drawing of a vehicle in which a vehicle control system is mounted that has a positional precision assessment device of the embodiment.

FIG. 2 is a general schematic drawing of a vehicle in which a vehicle control system 1 is mounted that has a location estimating device 12 of the embodiment. The vehicle control system 1 has a camera 2, a positioning information receiver 3, a navigation device 4, a user interface (UI) 5, a vehicle speed sensor 6, a yaw rate sensor 7, a map information storage device 11, a location estimating device 12, an object detector 13, a traveling lane planning device 14, a drive planning device 15 and a vehicle control device 16. The vehicle control system 1 may also have a LiDAR sensor, as a distance sensor (not shown) for measurement of the distance of the vehicle 10 to surrounding objects.

The camera 2, positioning information receiver 3, navigation device 4, UI 5, vehicle speed sensor 6, yaw rate sensor 7, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 17 to the location estimating device 12 and object detector 13 etc. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route from the current location to the destination location of the vehicle 10, in response to a request by the driver. The navigation route includes information relating to the locations of right turns, left turns, merging and branching. When the destination location has been newly set or the current location of the vehicle 10 has exited the navigation route, the navigation device 4 creates a new navigation route for the vehicle 10. Every time a navigation route is created, the navigation device 4 outputs the navigation route to the location estimating device 12 and the traveling lane planning device 14 etc., via the in-vehicle network 17.

The UI 5 is an example of the notification unit. The UI 5, controlled by the navigation device 4 and location estimating device 12, notifies the driver of the vehicle 10 traveling information, hands-on request or control transition request. The traveling information of the vehicle 10 includes information relating to the current location of the vehicle and the current and future route of the vehicle, such as the navigation route. The hands-on request is a request for the driver to hold the steering wheel. A control transition request is a request for the driver to switch driving of the vehicle 10 from autonomous control to manual control. The UI 5 also creates an operation signal in response to operation of the vehicle 10 by the driver. The UI 5 has a display device 5a such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed or other control information for the vehicle 10. The UI 5 outputs the input operation information to the navigation device 4 and the vehicle control device 16 etc., via the in-vehicle network 17.

The vehicle speed sensor 6 detects information for the speed of the vehicle 10, and outputs the vehicle speed information and the speed information acquisition time at which the vehicle speed information was acquired, to the location estimating device 12 etc through the in-vehicle network 17. The vehicle speed sensor 6 is mounted on an axle (not shown), for example, and detects the rotational speed of the axle, outputting a pulse signal in proportion to the rotational speed.

The yaw rate sensor 7 detects the yaw rate of the vehicle 10, and outputs the yaw rate and a yaw rate information acquisition time at which the yaw rate was acquired, to the location estimating device 12 etc. through the in-vehicle network 17. An acceleration sensor such as a gyroscope, for example, may be used as the yaw rate sensor 7.

The map information storage device 11 stores wide-area map information for a relatively wide area (an area of 10 to 30 km$^2$, for example) that includes the current location of the vehicle 10. The map information preferably has high precision map information including three-dimensional information for the road surface, information for the types and locations of structures and road features such as road surface marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 3, the map information storage device 11 refers to the stored wide-area map information and outputs map information for a relatively narrow area including the current location represented by the positioning information (for example, an area of 100 $m^2$ to 10 $km^2$), through the in-vehicle network 17 to the location estimating device 12, object detector 13, traveling lane planning device 14, drive planning device 15 and vehicle control device 16 etc.

The location estimating device 12 carries out location estimation processing, calculation processing and assessment processing. For this purpose, the location estimating device 12 has a communication interface (IF) 21, a memory 22 and a processor 23. The communication interface 21, memory 22 and processor 23 are connected via signal wires 24. The communication interface 21 has an interface circuit to connect the location estimating device 12 with the in-vehicle network 17.

All or some of the functions of the location estimating device 12 are functional modules driven by a computer program operating on the processor 23, for example. The processor 23 has a location estimating unit 230, a calculating unit 231 and an assessment unit 232. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device.

Each time the current location of the vehicle 10 is determined at the camera image photograph time, the location estimating device 12 outputs the current location to the object detector 13, traveling lane planning device 14, drive planning device 15 and vehicle control device 16 etc. Operation of the location estimating device 12 will be described in detail below.

The object detector 13 detects other objects around the vehicle 10 and their types (for example, vehicles) based on the camera image, for example. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 13 outputs object detection information which includes information representing the types of other objects that were detected, information indicating their locations, and also information indicating their traveling lanes, to the traveling lane planning device 14 and drive planning device 15 etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The traveling lane planning device 14 also determines whether or not a lane change is necessary within the nearest driving zone selected from the navigation route, based on the traveling lane plan, the map information, the navigation route and the current location of the vehicle 10, and generates a lane change plan in accordance with the assessment results. Specifically, the traveling lane planning device 14 determines whether or not a lane change is necessary for moving to a traffic lane toward the destination location of the vehicle 10, based on the navigation route and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. When a lane change plan has been generated, the traveling lane planning device 14 outputs the traveling lane plan with the added lane change plan to the drive planning device 15.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 15 generates a driving plan for stopping the vehicle 10. The drive planning device 15 outputs the driving plan to the vehicle control device 16 for each driving plan generated.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also determines the amount of fuel injection according to a set accelerator level, and outputs a control signal corresponding to the amount of fuel injection to a drive unit (not shown) of the engine of the vehicle 10, via the in-vehicle network 17. Alternatively, the vehicle control device 16 may output a control signal corresponding to a set brake level to the brake (not shown) of the vehicle 10, via the in-vehicle network 17.

The vehicle control device 16 has an autonomous control operating mode in which the vehicle 10 is operated by the autonomous control system 1, and a manual control operating mode in which the driver operates the vehicle 10 manually. When autonomous control operating mode has been applied, the vehicle control device 16 enables autonomous control of operation of the vehicle 10 including engine actuation, braking and steering. When the driver has acknowledged the control change notification that change from autonomous control to manual control is required, the vehicle control device 16 in autonomous control operating mode switches operation of the vehicle 10 from autonomous control operating mode to manual control operating mode. Therefore when the vehicle 10 cannot safely travel by autonomous control, the driver can use the steering wheel, accelerator pedal and brake pedal (not shown) for traveling by manually controlled operation of the vehicle 10. In the manual control operating mode, at least one operation of the vehicle 10 from among engine actuation, braking and steering is controlled manually. The vehicle control device 16 generates a control signal in response to the degree of operation of the steering wheel, accelerator pedal and brake pedal. A change from autonomous control to manual control is possible, depending on the request by the driver.

For FIG. 2, the map information storage device 11, location estimating device 12, object detector 13, traveling lane planning device 14, drive planning device 15 and vehicle control device 16 were explained as separate devices (Electronic Control Units (ECU), for example), but all or some of them may be constructed in a single device.

Figure 3:
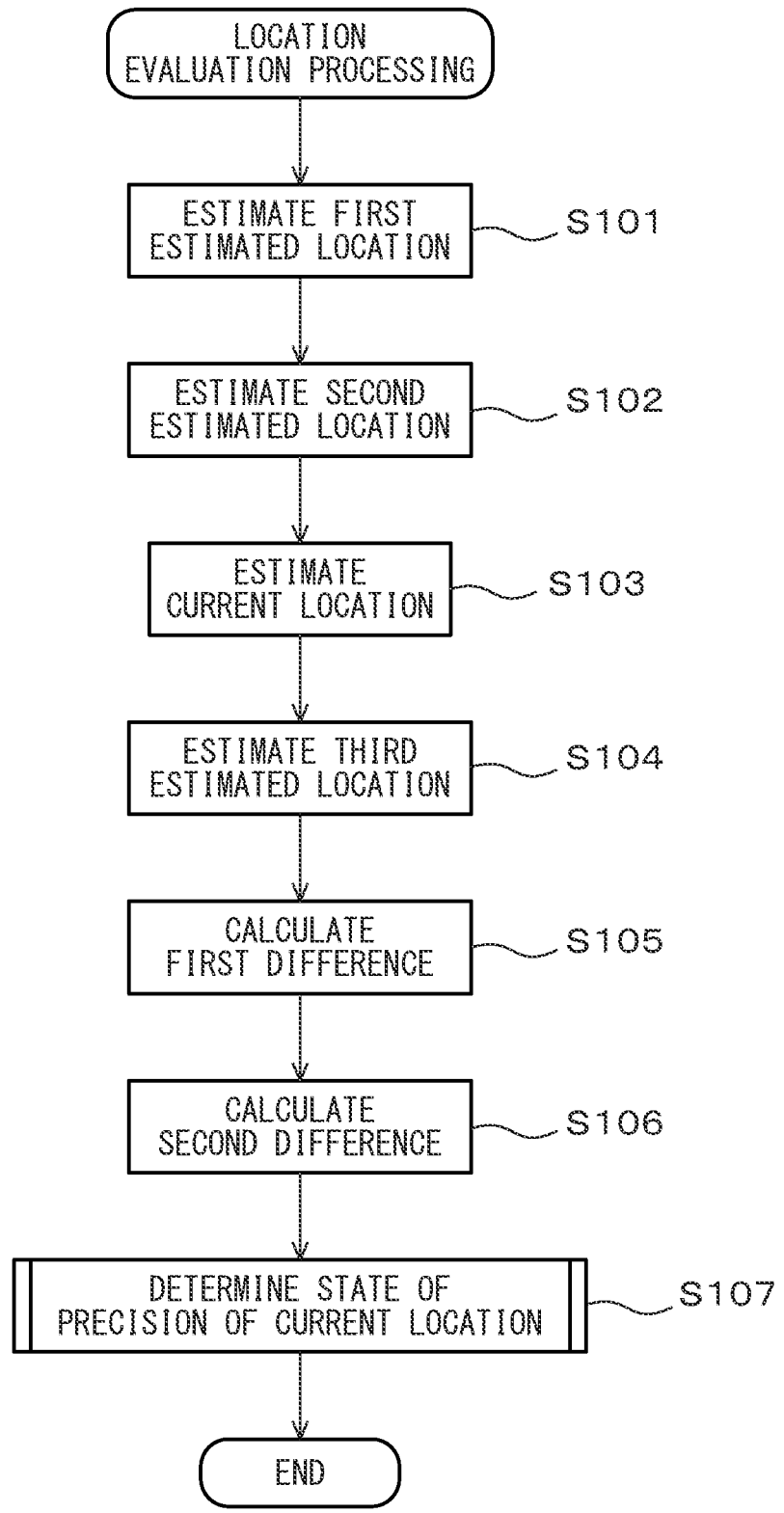
FIG. 3 is an example of an operation flow chart for positional precision assessment processing of a location estimating device according to the embodiment.

FIG. 3 is an example of an operation flow chart for positional precision assessment processing of the location estimating device 12 according to the embodiment. Positional precision assessment processing by the location estimating device 12 will now be explained with reference to FIG. 3. The location estimating device 12 carries out positional precision assessment processing according to the operation flow chart shown in FIG. 3, each time a camera image is input.

First, the location estimating unit 230 estimates the first estimated location of the vehicle 10 at the current camera image photograph time, based on the camera image representing road features on the road surface surrounding the vehicle 10 at the current camera image photograph time, and positional information for the road features on the road surface (step S101). The location estimating unit 230 is an example of a first location estimating unit. For example, the location estimating unit 230 compares lane marking lines identified in the camera image with lane marking lines represented in the map information input from the map information storage device 11, and determines the first estimated location and first estimated direction of the vehicle 10 at the camera image photograph time. The lane marking line is an example of a road feature.

The location estimating unit 230 then estimates a second estimated location (location estimated by dead reckoning) and second estimated direction of the vehicle 10 at the current camera image photograph time, based on the location of the moving object at the previous camera image photograph time and on amount of movement and change in direction of the vehicle 10 from the previous camera image photograph time to the current camera image photograph time (step S102). The location estimating unit 230 is an example of a second location estimating unit. The location estimating unit 230 integrates the vehicle speed determined from the information for the speed of the vehicle 10, and determines the amount of movement of the vehicle 10 between the previous and current camera image photograph time. The location estimating unit 230 also integrates the yaw rate determined from the information for the yaw rate of the vehicle 10, and determines the amount of change in direction of the vehicle 10 between the previous and current camera image photograph time. Using the location and direction of the vehicle 10 at the previous camera image photograph time, and the amount of movement and change in direction, the location estimating unit 230 determines the second estimated location and second estimated direction, estimated by dead reckoning.

Figure 4:
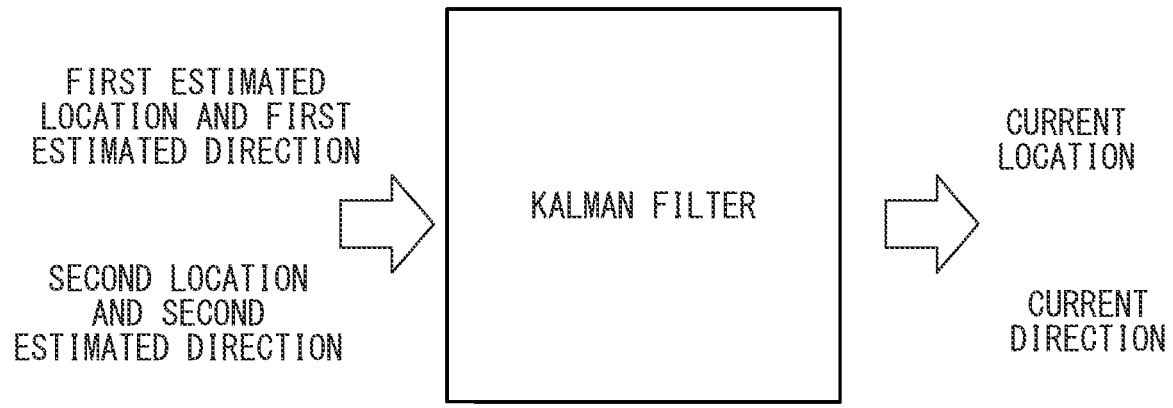
FIG. 4 is a diagram illustrating a prediction filter.

As shown in FIG. 4, the calculating unit 231 then inputs the first estimated location and first estimated direction, as well as the second estimated location and second estimated direction, into a prediction filter and calculates the current location and current direction of the vehicle 10 at the current camera image photograph time (step S103). FIG. 4 is a diagram illustrating a prediction filter. The prediction filter used may be a Kalman filter, for example. However, the prediction filter used may also be a filter other than a Kalman filter.

The location estimating unit 230 estimates the road traveling lane where the vehicle 10 is located, based on the lane marking lines represented in the map information and on the current location and current direction of the vehicle 10. Each time the current location and current direction of the vehicle 10 and the traveling lane are determined for the camera image photograph time, the location estimating unit 230 outputs this information to the object detector 13, traveling lane planning device 14, drive planning device 15 and vehicle control device 16 etc.

The location estimating unit 230 then estimates a third estimated location of the vehicle 10 at the current camera image photograph time, based on the location and direction of the vehicle 10 at a camera image photograph time prior to the current camera image photograph time, and on the amount of movement and change in direction of the vehicle 10 from that previous camera image photograph time to the current camera image photograph time (step S104). The camera image photograph time prior to the current camera image photograph time may be the previous camera image photograph time. In this case, the third estimated location will be the same as the second estimated location, and therefore step S104 is omitted. The camera image photograph time prior to the current camera image photograph time may also be another time, such as two camera image photograph times prior, for example.

The assessment unit 232 then determines a first difference between the first estimated location and second estimated location of the vehicle 10 at the current camera image photograph time (step S105). The first difference represents the distance between the first estimated location and second estimated location. The first difference may also be divided into a vertical difference in the direction matching the traveling direction of the vehicle 10 and a horizontal difference in the transverse direction perpendicular to the traveling direction of the vehicle 10. The first difference may also be the distance between two locations on the map. The first difference is an example of the second difference described in the Claims.

Figure 5:
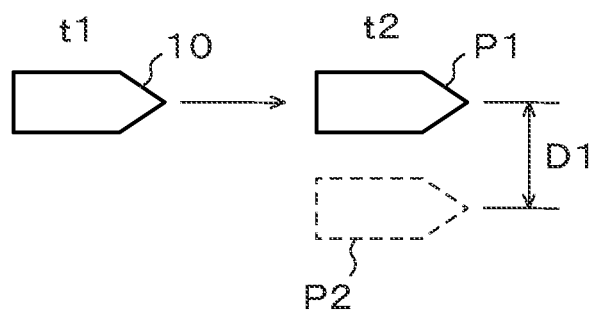
FIG. 5 is a diagram illustrating an example of a first difference.

FIG. 5 is a diagram illustrating an example of the first difference. At the current camera image photograph time t2, the vehicle 10 has moved from the location at the previous camera image photograph time t1 to first estimated location P1. At the current camera image photograph time t2, the assessment unit 232 calculates the horizontal difference between a location in the transverse direction at the first estimated location P1, and a location in the transverse direction at the second estimated location P2, as the first difference D1. If the first difference is large, it may be attributable to an abnormality in the camera 2, a mismatch between the map information and the current terrain, or an abnormality in the vehicle speed sensor 6 and/or yaw rate sensor 7.

The first difference D1 between a first estimated location P1 of the vehicle 10 estimated based on an image representing road features and positional information for the road features, and a second estimated location P2 of the vehicle 10 estimated by dead reckoning, represents the relative validity of the second estimated location P2 with respect to the first estimated location P1.

The assessment unit 232 then determines a second difference between the third estimated location of the vehicle 10 at the current camera image photograph time, and the current location (step S106). The second difference represents the distance between the third estimated location and current location. The second difference may also be divided into a vertical difference in the direction matching the traveling direction of the vehicle 10 and a horizontal difference in the direction perpendicular to the traveling direction of the vehicle 10. The second difference may also be the distance between two locations on the map. When the second difference is large and the first difference is small, the cause may be that the vehicle 10 is sliding laterally. The second difference is an example of the first difference described in the Claims.

Figure 6:
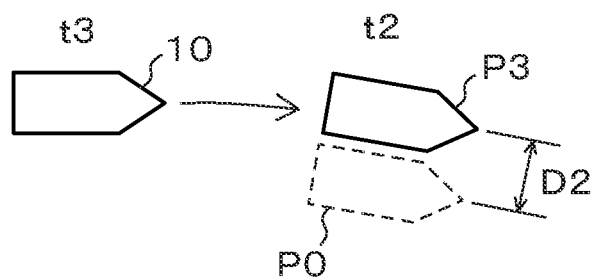
FIG. 6 is a diagram illustrating an example of a second difference.

FIG. 6 is a diagram illustrating an example of the second difference. At the current camera image photograph time t2, the vehicle 10 has moved from the location at the previous camera image photograph time t3 to third estimated location P3. At the current camera image photograph time t2, the assessment unit 232 calculates the difference between a location in the transverse direction at the current location P0 of the vehicle 10, and a location in the transverse direction at the third estimated location P3, as the second difference D2. When the vehicle 10 is traveling on a curving road as in the example shown in FIG. 6, it may slide laterally depending on the condition of the road surface.

The second difference D2 between the third estimated location P3 of the vehicle 10 estimated by dead reckoning and the current location P0 of the vehicle 10 calculated using a prediction filter represents the validity of the current location P0 of the vehicle 10 with respect to the third estimated location P3.

The assessment unit 232 then determines the state of precision of the current location of the vehicle 10 based on the first difference and/or second difference, thus completing the series of processing steps (step S107). Assessment processing by the assessment unit 232 will now be described in detail.

Figure 7:
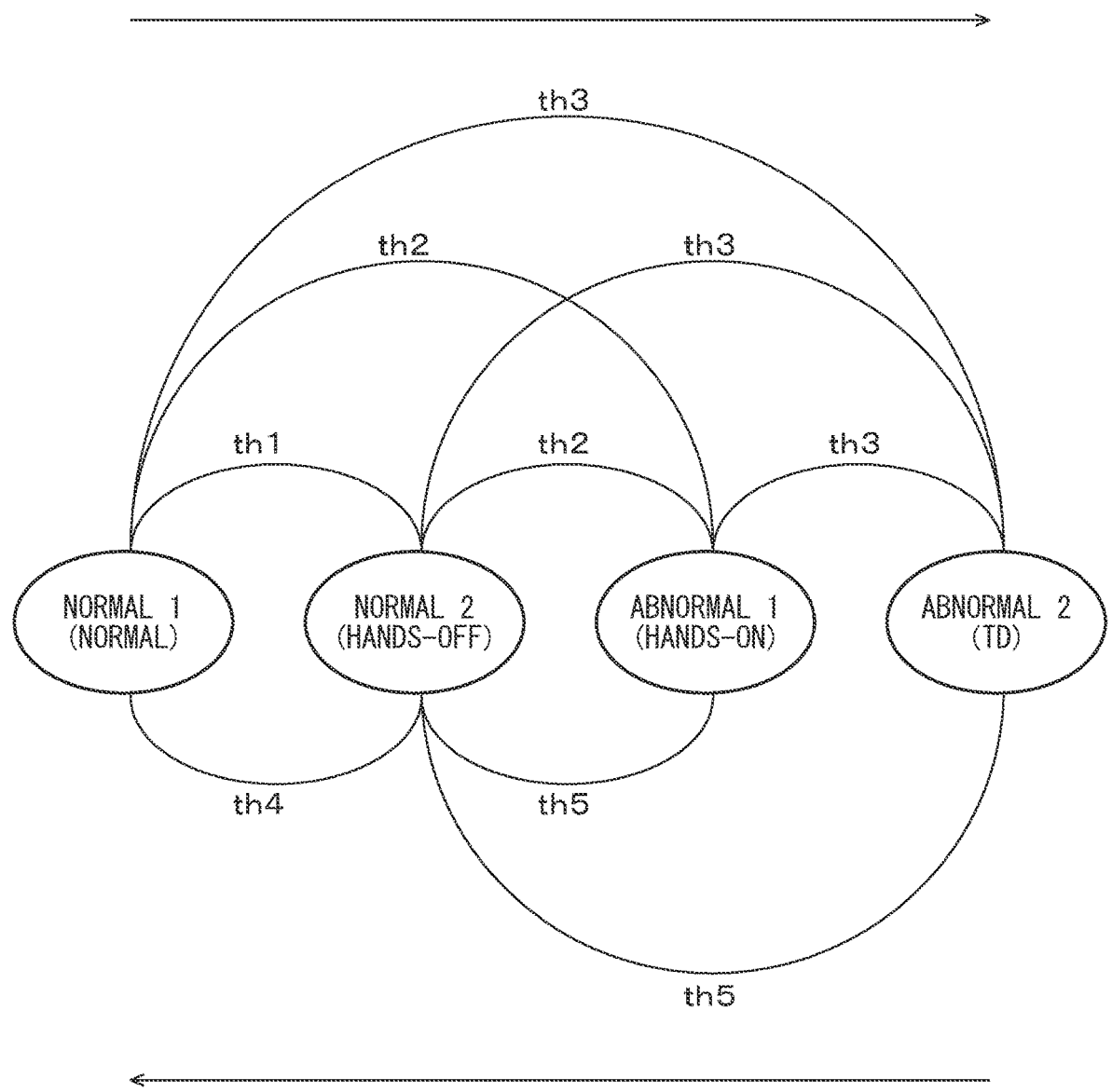
FIG. 7 is a diagram illustrating an example of assessment processing.

FIG. 7 is a diagram illustrating an example of assessment processing. As shown in FIG. 7, the state of precision of the current location of the vehicle 10 is determined as Normal 1 (Normal), Normal 2 (Hands-off), Abnormal 1 (Hands-on) or Abnormal 2 (Transition Demand: TD).

When the state of precision of the current location of the vehicle 10 is determined to be Normal 1 (Normal), driving of the vehicle 10 is automatically controlled in a safe manner based on the current location of the vehicle 10 estimated by the location estimating device 12.

When the state of precision of the current location of the vehicle 10 is determined to be Normal 2 (Hands-off), the precision of the current location of the vehicle 10 is in the allowable range for control of the autonomous control system 1, although less than for Normal 1 (Normal). Driving of the vehicle 10 can therefore be autonomously controlled in a safe manner based on the current location of the vehicle 10 estimated by the location estimating device 12.

When the state of precision of the current location of the vehicle 10 is determined to be Abnormal 1 (Hands-on), the precision of the current location of the vehicle 10 may potentially be beyond the allowable range for control of the autonomous control system 1. When the state of precision of the current location of the vehicle 10 has been determined to be Abnormal 1 (Hands-on), the assessment unit 232 gives notification of a request to contribute to driving of the vehicle 10, via the UI 5. Specifically, the assessment unit 232 notifies the driver of a hands-on request for holding of the steering wheel. The autonomous control system 1 automatically controls driving of the vehicle 10 with the steering wheel being held by the driver. The driver can operate the steering wheel when the driver has determined that driving of the vehicle 10 by autonomous control is not safe.

When the state of precision of the current location of the vehicle 10 is determined to be Abnormal 2 (TD), the precision of the current location of the vehicle 10 is estimated to be beyond the allowable range for control of the autonomous control system 1. When the state of precision of the current location of the vehicle 10 has been determined to be Abnormal 2 (TD), the assessment unit 232 notifies the driver of a request to further contribute to driving of the vehicle 10, via the UI 5. Specifically, the assessment unit 232 notifies the driver of a control transition request via the UI 5, as a request to switch driving of the vehicle 10 from autonomous control to manual control.

Figure 8:
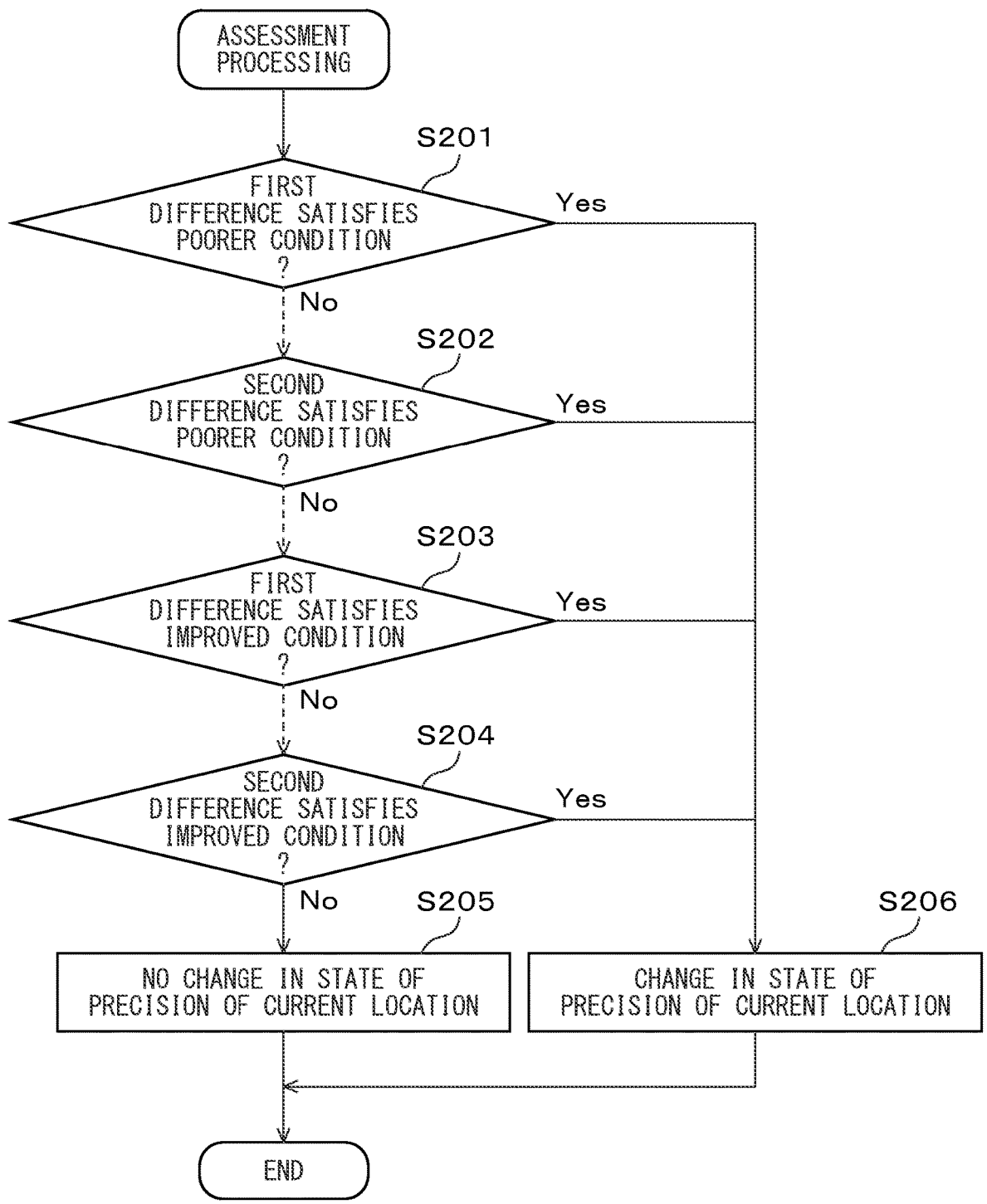
FIG. 8 is an example of an operation flow chart for assessment processing of a location estimating device according to the embodiment.

FIG. 8 is an example of an operation flow chart for assessment processing of the location estimating device 12 according to the embodiment. Assessment processing is carried out according to the operation flow chart shown in FIG. 8 for each current state of precision of the current location of the vehicle 10.

The current state of precision of the current location of the vehicle 10 will be explained first for assessment processing for Normal 1 (Normal).

First, the assessment unit 232 determines whether or not the first difference satisfies a poorer condition (step S201). The poorer condition is a condition indicating whether or not the state of precision of the current location of the vehicle 10 is worse than the current state. The poorer condition may be one in which the proportion of first differences, from among multiple first differences calculated between the current camera photograph time and the time just before it by a predetermined time (such as 1 second), that exceed a poorer condition threshold is above a reference value. For example, the condition th1 with change from Normal 1 (Normal) to Normal 2 (Hands-off) may have 0.1 m as the poorer condition threshold and 0.5 as the reference value. The condition th2 with change from Normal 1 (Normal) to Abnormal 1 (Hands-on) may have 0.3 m as the poorer condition threshold and 0.6 as the reference value. The condition th3 with change from Normal 1 (Normal) to Abnormal 2 (TD) may have 0.5 m as the poorer condition threshold and 0.8 as the reference value.

Assessment that condition 1 is satisfied, for the purpose of the present specification, means that multiple first differences calculated between the current camera photograph time and the time just before it by a predetermined time (such as 1 second) satisfy condition 1 but do not satisfy condition 2. Assessment that condition 2 is satisfied, for the purpose of the present specification, means that multiple first differences calculated between the current camera photograph time and the time just before it by a predetermined time (such as 1 second) satisfy condition 2 but do not satisfy condition 3. This also applies to the other assessment processing.

When the first difference satisfies the poorer condition (step S201—Yes), the assessment unit 232 changes the state of precision of the current location of the vehicle 10 (step S206), and the series of processing steps is complete. When the first difference satisfies condition th1, the state of precision of the current location of the vehicle 10 is changed from Normal 1 (Normal) to Normal 2 (Hands-off). When the first difference satisfies condition th2, the state of precision of the current location of the vehicle 10 is changed from Normal 1 (Normal) to Abnormal 1 (Hands-on). When the first difference satisfies condition th3, the state of precision of the current location of the vehicle 10 is changed from Normal 1 (Normal) to Abnormal 2 (TD).

When the first difference does not satisfy the poorer condition (step S201—No), the assessment unit 232 determines whether or not the second difference satisfies the poorer condition (step S202). The poorer condition may be one in which at least one second difference, from among multiple second differences calculated between the current camera photograph time and the time just before it by a predetermined time (such as 1 second), is equal to or greater than the poorer condition threshold. For example, the condition th1 with change from Normal 1 (Normal) to Normal 2 (Hands-off) may have 0.2 m as the poorer condition threshold. The condition th2 with change from Normal 1 (Normal) to Abnormal 1 (Hands-on) may have 0.4 m as the poorer condition threshold. The condition th3 with change from Normal 1 (Normal) to Abnormal 2 (TD) may have 0.6 m as the poorer condition threshold. When curvature assessment of the road on which the vehicle 10 is traveling is greater than a reference curvature, the poorer condition threshold may be higher than when it is equal to or below the reference curvature. This is because the degree of change in location tends to be larger when the road is curved. For the second difference it is not necessary to determine change from Normal 1 (Normal) to Normal 2 (Hands-off).

When the second difference satisfies the poorer condition (step S202—Yes), the assessment unit 232 changes the state of precision of the current location of the vehicle 10 (step S206), and the series of processing steps is complete. When the second difference satisfies condition th1, the state of precision of the current location of the vehicle 10 is changed from Normal 1 (Normal) to Normal 2 (Hands-off). When the second difference satisfies condition th2, the state of precision of the current location of the vehicle 10 is changed from Normal 1 (Normal) to Abnormal 1 (Hands-on). When the second difference satisfies condition th3, the state of precision of the current location of the vehicle 10 is changed from Normal 1 (Normal) to Abnormal 2 (TD).

When the second difference does not satisfy the poorer condition (step S202—No), the assessment unit 232 determines that the state of precision of the current location of the vehicle 10 has no change (step S205), and the series of processing steps is complete. When the current state of precision of the current location of the vehicle 10 is Normal 1 (Normal), the processing of step S203 and step S204 is not carried out.

The current state of precision of the current location of the vehicle 10 will now be explained for assessment processing for Normal 2 (Hands-off).

First, the assessment unit 232 determines whether or not the first difference satisfies a poorer condition (step S201). The poorer condition may be one in which the proportion of first differences, from among multiple first differences calculated between the current camera photograph time and the time just before it by a predetermined time (such as 1 second), that exceed a poorer condition threshold is equal to or above a reference value. For example, the condition th2 with change from Normal 2 (Hands-off) to Abnormal 1 (Hands-on) may have 0.3 m as the poorer condition threshold and 0.6 as the reference value. The condition th3 with change from Normal 2 (Hands-off) to Abnormal 2 (TD) may have 0.5 m as the poorer condition threshold and 0.8 as the reference value.

When the first difference satisfies the poorer condition (step S201—Yes), the assessment unit 232 changes the state of precision of the current location of the vehicle 10 (step S206), and the series of processing steps is complete. When the first difference satisfies condition th2, the state of precision of the current location of the vehicle 10 is changed from Normal 2 (Hands-off) to Abnormal 1 (Hands-on). When the first difference satisfies condition th3, the state of precision of the current location of the vehicle 10 is changed from Normal 2 (Hands-off) to Abnormal 2 (TD).

When the first difference does not satisfy the poorer condition (step S201—No), the assessment unit 232 determines whether or not the second difference satisfies the poorer condition (step S202). The poorer condition may be one in which at least one second difference, from among multiple second differences calculated between the current camera photograph time and the time just before it by a predetermined time (such as 1 second), is equal to or greater than the poorer condition threshold. For example, the condition th2 with change from Normal 2 (Hands-off) to Abnormal 1 (Hands-on) may have 0.4 m as the poorer condition threshold. The condition th3 with change from Normal 2 (Hands-off) to Normal 2 (Hands-off) may have 0.6 m as the poorer condition threshold. When curvature assessment of the road on which the vehicle 10 is traveling is greater than a reference curvature, the poorer condition threshold may be higher than when it is equal to or below the reference curvature.

When the second difference satisfies the poorer condition (step S202—Yes), the assessment unit 232 changes the state of precision of the current location of the vehicle 10 (step S206), and the series of processing steps is complete. When the second difference satisfies condition th2, the state of precision of the current location of the vehicle 10 is changed from Normal 2 (Hands-off) to Abnormal 1 (Hands-on). When the second difference satisfies condition th3, the state of precision of the current location of the vehicle 10 is changed from Normal 2 (Hands-off) to Abnormal 2 (TD).

When the second difference does not satisfy the poorer condition (step S202—No), the assessment unit 232 determines whether or not the first difference satisfies the improved condition (step S203). The improved condition is a condition indicating whether or not the state of precision of the current location of the vehicle 10 is better than the current state. The improved condition may be one in which the proportion of first differences, from among multiple first differences calculated between the current camera photograph time and the time just before it by a predetermined time (such as 1 second), that are equal to or below an improved condition threshold is equal to or above a reference value. For example, the condition th4 with change from Normal 2 (Hands-off) to Normal 1 (Normal) may have 0.1 m as the improved condition threshold and 0.8 as the reference value.

When the first difference satisfies the improved condition (step S203—Yes), the assessment unit 232 changes the state of precision of the current location of the vehicle 10 (step S206), and the series of processing steps is complete. When the first difference satisfies condition th4, the state of precision of the current location of the vehicle 10 is changed from Normal 2 (Hands-off) to Normal 1 (Normal).

When the first difference does not satisfy the improved condition (step S203—No), the assessment unit 232 determines whether or not the second difference satisfies the improved condition (step S204). The improved condition may be one in which at least one second difference, from among multiple second differences calculated between the current camera photograph time and the time just before it by a predetermined time (such as 1 second), is equal to or less than the improved condition threshold. For example, the condition th4 with change from Normal 2 (Hands-off) to Normal 1 (Normal) may have 0.2 m as the improved condition threshold.

When the second difference satisfies the improved condition (step S204—Yes), the assessment unit 232 changes the state of precision of the current location of the vehicle 10 (step S206), and the series of processing steps is complete. When the second difference satisfies condition th4, the state of precision of the current location of the vehicle 10 is changed from Normal 2 (Hands-off) to Normal 1 (Normal).

When the second difference does not satisfy the improved condition (step S203—No), the assessment unit 232 determines that the state of precision of the current location of the vehicle 10 has no change (step S205), and the series of processing steps is complete.

The current state of precision of the current location of the vehicle 10 will now be explained for assessment processing for Abnormal 1 (Hands-on).

First, the assessment unit 232 determines whether or not the first difference satisfies a poorer condition (step S201). The poorer condition may be one in which the proportion of first differences, from among multiple first differences calculated between the current camera photograph time and the time just before it by a predetermined time (such as 1 second), that exceed a poorer condition threshold is equal to or above a reference value. For example, the condition th3 with change from Abnormal 1 (Hands-on) to Abnormal 2 (TD) may have 0.5 m as the poorer condition threshold and 0.8 as the reference value.

When the first difference satisfies the poorer condition (step S201—Yes), the assessment unit 232 changes the state of precision of the current location of the vehicle 10 (step S206), and the series of processing steps is complete. When the first difference satisfies condition th3, the state of precision of the current location of the vehicle 10 is changed from Abnormal 1 (Hands-on) to Abnormal 2 (TD).

When the first difference does not satisfy the poorer condition (step S201—No), the assessment unit 232 determines whether or not the second difference satisfies the poorer condition (step S202). The poorer condition may be one in which at least one second difference, from among multiple second differences calculated between the current camera photograph time and the time just before it by a predetermined time (such as 1 second), is equal to or less than the poorer condition threshold. For example, the condition th3 with change from Abnormal 1 (Hands-on) to Abnormal 2 (TD) may have 0.6 m as the poorer condition threshold. When curvature assessment of the road on which the vehicle 10 is traveling is greater than a reference curvature, the poorer condition threshold may be higher than when it is equal to or below the reference curvature.

When the second difference satisfies the poorer condition (step S202—Yes), the assessment unit 232 changes the state of precision of the current location of the vehicle 10 (step S206), and the series of processing steps is complete. When the second difference satisfies condition th3, the state of precision of the current location of the vehicle 10 is changed from Abnormal 1 (Hands-on) to Abnormal 2 (TD).

When the second difference does not satisfy the poorer condition (step S202—No), the assessment unit 232 determines whether or not the first difference satisfies the improved condition (step S203). The improved condition may be one in which the proportion of first differences, from among multiple first differences calculated between the current camera photograph time and the time just before it by a predetermined time (such as 1 second), that are equal to or below an improved condition threshold is equal to or above a reference value. For example, the condition th5 with change from Abnormal 1 (Hands-on) to Normal 2 (Hands-off) may have 0.3 m as the improved condition threshold and 1.0 as the reference value.

When the first difference satisfies the improved condition (step S203—Yes), the assessment unit 232 changes the state of precision of the current location of the vehicle 10 (step S206), and the series of processing steps is complete. When the first difference satisfies condition th5, the state of precision of the current location of the vehicle 10 is changed from Abnormal 1 (Hands-on) to Normal 2 (Hands-off).

When the first difference does not satisfy the improved condition (step S203—No), the assessment unit 232 determines whether or not the second difference satisfies the improved condition (step S204). The improved condition may be one in which at least one second difference, from among multiple second differences calculated between the current camera photograph time and the time just before it by a predetermined time (such as 1 second), is equal to or less than the improved condition threshold. For example, the condition th5 with change from Abnormal 1 (Hands-on) to Normal 2 (Hands-off) may have 0.4 m as the improved condition threshold.

When the second difference satisfies the improved condition (step S204—Yes), the assessment unit 232 changes the state of precision of the current location of the vehicle 10 (step S206), and the series of processing steps is complete. When the second difference satisfies condition th5, the state of precision of the current location of the vehicle 10 is changed from Abnormal 1 (Hands-on) to Normal 2 (Hands-off).

When the second difference does not satisfy the improved condition (step S204—No), the assessment unit 232 determines that the state of precision of the current location of the vehicle 10 has no change (step S205), and the series of processing steps is complete.

The current state of precision of the current location of the vehicle 10 will now be explained for assessment processing for Abnormal 2 (TD). When the current state of precision of the current location of the vehicle 10 is Abnormal 2 (TD), assessment processing is carried out until the driver acknowledges the control transfer request.

First, the assessment unit 232 determines whether or not the first difference satisfies the improved condition (step S203). When the current state of precision of the current location of the vehicle 10 is Abnormal 2 (TD), the processing of step S201 and step S202 is not carried out. The improved condition may be one in which the proportion of first differences, from among multiple first differences calculated between the current camera photograph time and the time just before it by a predetermined time (such as 1 second), that are equal to or below an improved condition threshold is equal to or above a reference value. For example, the condition th5 with change from Abnormal 2 (TD) to Normal 2 (Hands-off) may have 0.3 m as the improved condition threshold and 1.0 as the reference value.

When the first difference satisfies the improved condition (step S203—Yes), the assessment unit 232 changes the state of precision of the current location of the vehicle 10 (step S206), and the series of processing steps is complete. When the first difference satisfies condition th5, the state of precision of the current location of the vehicle 10 is changed from Abnormal 2 (TD) to Normal 2 (Hands-off).

When the first difference does not satisfy the improved condition (step S203—No), the assessment unit 232 determines whether or not the second difference satisfies the improved condition (step S204). The improved condition may be one in which at least one second difference, from among multiple second differences calculated between the current camera photograph time and the time just before it by a predetermined time (such as 1 second), is equal to or less than the improved condition threshold. For example, the condition th5 with change from Abnormal 2 (TD) to Normal 2 (Hands-off) may have 0.4 m as the improved condition threshold.

When the second difference satisfies the improved condition (step S204—Yes), the assessment unit 232 changes the state of precision of the current location of the vehicle 10 (step S206), and the series of processing steps is complete. When the second difference satisfies condition th5, the state of precision of the current location of the vehicle 10 is changed from Abnormal 2 (TD) to Normal 2 (Hands-off).

When the second difference does not satisfy the improved condition (step S204—No), the assessment unit 232 determines that the state of precision of the current location of the vehicle 10 has no change (step S205), and the series of processing steps is complete.

In the assessment processing described above, the assessment 233 determined the state of precision of the current location of the vehicle 10 based on the first difference or second difference. However, the assessment 233 may also determine the state of precision of the current location of the vehicle 10 based on the first difference and second difference. In this case, the assessment 233 determines that the state of precision of the current location is poorer when both the first difference satisfies the poorer condition (step S201—Yes) and the second difference satisfies the poorer condition (step S202—Yes). The assessment 233 also determines that the state of precision of the current location is better when both the first difference satisfies the improved condition (step S203—Yes) and the second difference satisfies the improved condition (step S204—Yes).

Figure 9:
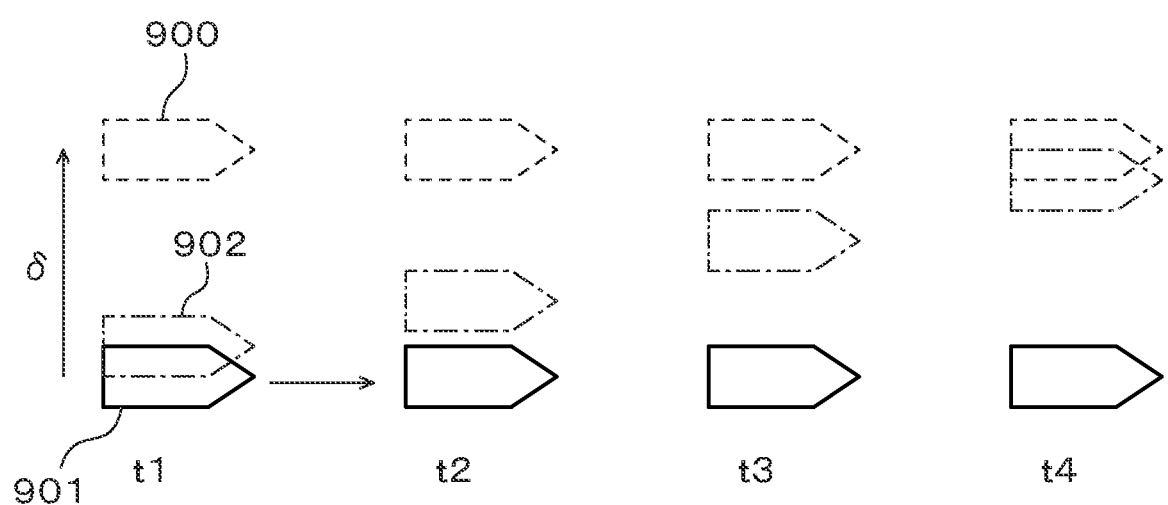
FIG. 9 is a diagram illustrating a manner of considering how to determine poorer condition and improved condition (1).
Figure 10:
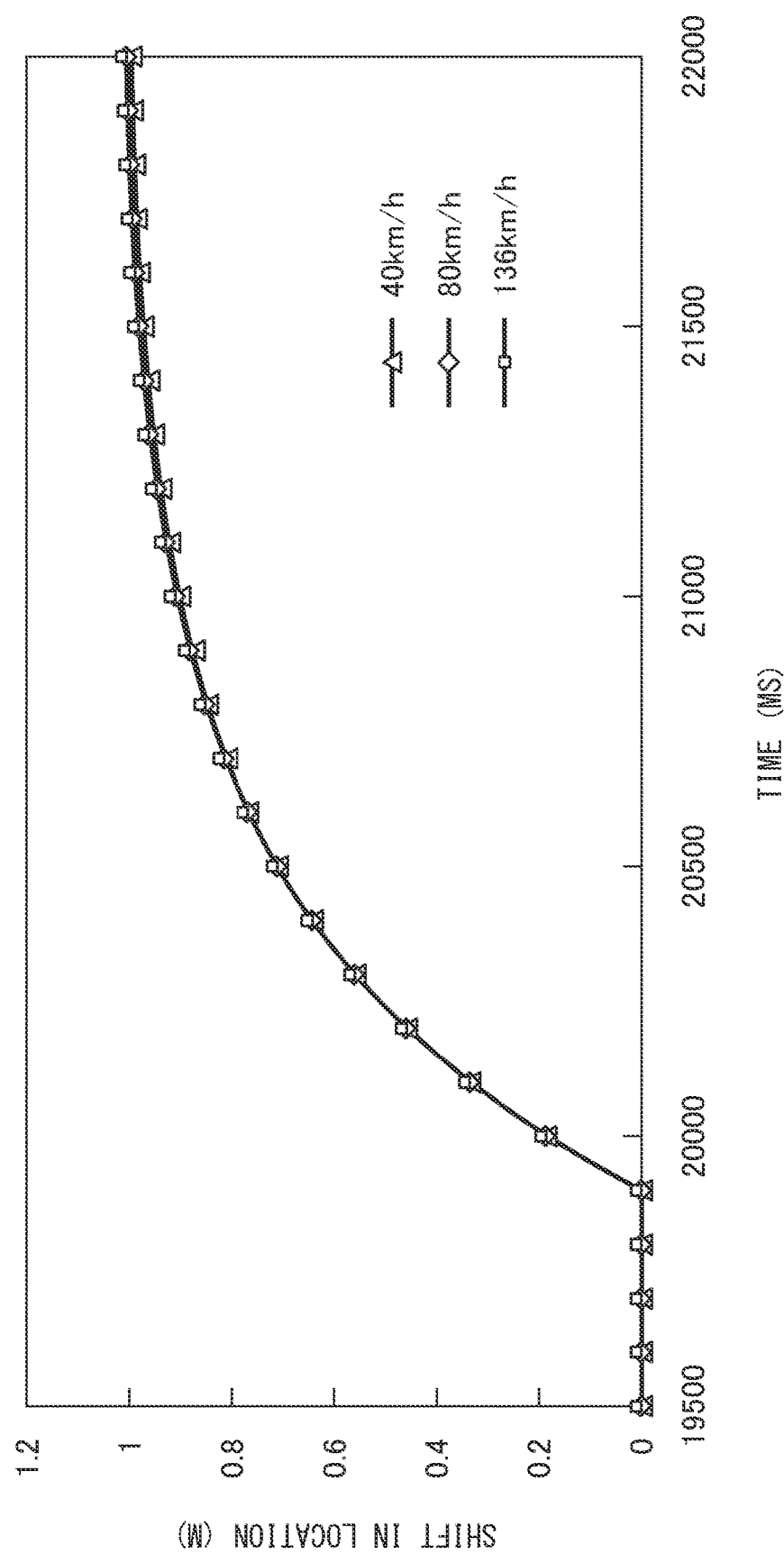
FIG. 10 is a diagram illustrating a manner of considering how to determine poorer condition and improved condition (2).

The method of considering how to determine the aforementioned poorer condition and improved condition will now be explained with reference to FIG. 9 and FIG. 10. FIG. 9 and FIG. 10 are diagrams illustrating a manner of considering how to determine poorer condition and improved condition.

In the example shown in FIG. 9, the vehicle 900 indicates a first estimated location at time t1 to t4 (estimated location based on road features), the vehicle 901 indicates a second estimated location at time t1 to t4 (estimated location based on dead reckoning), and the vehicle 902 indicates a current location at time t1 to t4 (estimated location based on prediction filter). A camera abnormality occurs at time t1, and the first estimated location indicated by the vehicle 900 has moved by δ (1 m) in the transverse direction with respect to the second estimated location indicated by the vehicle 901. The camera abnormality persists thereafter. The vehicle travels at a fixed speed, and the subsequent first estimated location, second estimated location and current location are determined by simulation. The current location indicated by the vehicle 902 approaches the first estimated location indicated by vehicle 900 as time progresses.

FIG. 10 shows degrees of positional shifting in the transverse direction for the current location of the vehicle 902, together with elapsed times, for vehicle speeds of 40 km/h, 80 km/h and 136 km/h. The total for each location is calculated every 100 ms.

The current location of the vehicle 902 moves up to 90% of the shift δ (1 m) due to abnormality in the first estimated location of the vehicle 900 during the time from time t1 (20,000 ms) to about 1 second afterwards (21,000 ms). The current location of the vehicle 902 moves about 0.1 m in the transverse direction in 100 msec, moves about 0.3 m in the transverse direction in 150 msec, and moves about 0.5 m in the transverse direction in 300 msec. The degree of positional shifting in the transverse direction for the current location of the vehicle 902 was about the same for vehicle speeds of 40 km/h, 80 km/h and 136 km/h. The first difference and second difference can be calculated every ~32 msec.

Based on the results shown in FIG. 10 for the poorer condition for the first difference, it is possible that the condition th1 has a poorer condition threshold of 0.1 m and a reference value of 0.5, the condition th2 has a poorer condition threshold of 0.3 m and a reference value of 0.6, and the condition th3 has a poorer condition threshold of 0.5 m and a reference value of 0.8.

Based on the results shown in FIG. 10 for the poorer condition for the second difference, it is possible that the condition th1 has a poorer condition threshold of 0.2 m, the condition th2 has a poorer condition threshold of 0.4 m and the condition th3 has a poorer condition threshold of 0.6 m.

Based on the results shown in FIG. 10 for the improved condition for the first difference, it is possible that the condition th4 has an improved condition threshold of 0.1 m and a reference value of 0.8, and the condition th5 has an improved condition threshold of 0.3 m and a reference value of 1.0.

Based on the results shown in FIG. 10 for the improved condition for the second difference, it is possible that the condition th4 has an improved condition threshold of 0.2 m and the condition th5 has an improved condition threshold of 0.4 m.

The positional precision assessment device of the embodiment described above can determine the state of precision of an estimated current location of the vehicle.

The positional precision assessment device, computer program for positional precision assessment and method for determining positional precision according to the embodiment described above may incorporate appropriate modifications that still fall within the gist of the disclosure. Moreover, the technical scope of the disclosure is not limited to these embodiments, and includes the invention and its equivalents as laid out in the Claims.

For example, for the embodiment described above the assessment unit determined the state of precision of the current location of the vehicle based on the first difference or second difference, but the assessment unit may also determine the state of precision of the current location of the vehicle based on the second difference.

Moreover, the first estimated location of the embodiment described above represented the estimated location of the vehicle for each camera photograph time. This does not allow calculation of the estimated location between the previous camera photograph time and the current camera photograph time based on road features. Therefore, the location of the vehicle between the estimated location of the vehicle at the previous camera photograph time and the estimated location of the vehicle at the current camera photograph time may be calculated by dead reckoning with the estimated location of the vehicle at the previous camera photograph time as the starting point, and used as the first estimated location.

The assessment processing described above is only one example, and the assessment conditions are not limited to the above description.

The invention claimed is:

1. A positional precision assessment device comprising:
a processor configured to
estimate a first location of a moving object at a first time based on an image representing road features on a road surface surrounding the moving object at the first time and positional information for the road features on the road surface,
estimate a second location of the moving object at the first time based on a location of the moving object at a second time which is before the first time, and an amount of movement and change in direction of the moving object from the second time to the first time,
input the first location and second location at the first time into a prediction filter and calculate a current location of the moving object at the first time,
determine a state of precision of the current location of the moving object by calculating a first difference between the current location of the moving object at the first time and a location estimated based on a location of the moving object at a time prior to the first time and an amount of movement and change in direction of the moving object from the prior time to the first time, and categorizing the state of precision in correspondence with whether autonomous driving in an autonomous vehicle is allowable based on the calculation, and
provide an indication via a user interface in the autonomous vehicle to indicate whether autonomous driving is allowable based upon the categorizing of the state.

2. The positional precision assessment device according to claim 1, wherein the processor is further configured to
calculate a second difference between the first location and the second location of the moving object at the first time, and
determine the state of precision of the current location of the moving object based on the first difference and second difference.

3. The positional precision assessment device according to claim 1, wherein the processor is further configured to
use a different reference when determining for change from a good state to a poor state of precision of the current location of the moving object, and when determining for change from the poor state to the good state of precision of the current location of the moving object.

4. The positional precision assessment device according to claim 2, wherein the processor is further configured to
determine the state of precision of the current location of the moving object by comparing the second difference with a predetermined reference threshold.

5. The positional precision assessment device according to claim 1, wherein the processor is further configured to
notify a driver of need to participate in operation of the moving object, via a notification unit, based on the state of precision of the current location of the moving object.

6. The positional precision assessment device according to claim 1, wherein the processor is further configured to use the second time as the prior time.

7. A computer-readable non-transitory storage medium storing a computer program for positional precision assessment, which causes a processor execute a process, the process comprising:
estimating a first location of a moving object at a first time based on an image representing road features on a road surface surrounding the moving object at the first time and positional information for the road features on the road surface;
estimating a second location of the moving object at the first time based on a location of the moving object at a second time which is before the first time, and an amount of movement and change in direction of the moving object from the second time to the first time;
inputting the first location and second location at the first time into a prediction filter and calculate a current location of the moving object at the first time; and
determining a state of precision of the current location of the moving object by calculating a first difference between the current location of the moving object at the first time and a location estimated based on a location of the moving object at a time prior to the first time and an amount of movement and change in direction of the moving object from the prior time to the first time, and categorizing the state of precision in correspondence with whether autonomous driving in an autonomous vehicle is allowable based on the calculation, and
providing an indication via a user interface in the autonomous vehicle to indicate whether autonomous driving is allowable based upon the categorizing of the state.

8. A method for determining positional precision carried out by a positional precision assessment device and the method comprising:
estimating a first location of a moving object at a first time based on an image representing road features on a road surface surrounding the moving object at the first time and positional information for the road features on the road surface;

estimating a second location of the moving object at the first time based on a location of the moving object at a second time which is before the first time, and an amount of movement and change in direction of the moving object from the second time to the first time;

inputting the first location and second location at the first time into a prediction filter and calculate a current location of the moving object at the first time; and determining a state of precision of the current location of the moving object by calculating a first difference between the current location of the moving object at the first time and a location estimated based on a location of the moving object at a time prior to the first time and an amount of movement and change in direction of the moving object from the prior time to the first time, and categorizing the state of precision in correspondence with whether autonomous driving in an autonomous vehicle is allowable based on the calculation, and providing an indication via a user interface in the autonomous vehicle to indicate whether autonomous driving is allowable based upon the categorizing of the state.

\* \* \* \* \*